(No Model.)
H. W. WINTER.
TRIMMING TOOL FOR BOOTS OR SHOES.
No. 402,376. Patented Apr. 30, 1889.
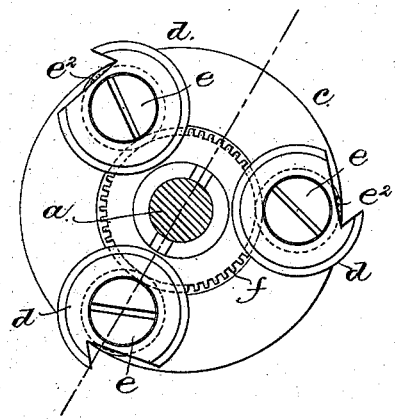
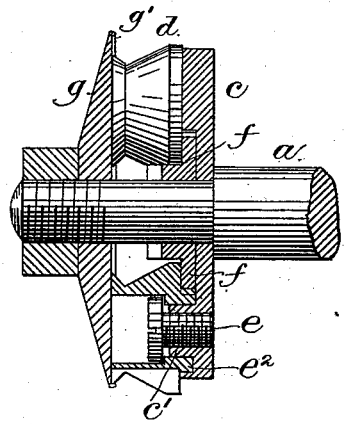
Witnesses.
Edgar A. Goddin.
Frederick L. Emery.
Inventor.
Henry W. Winter.
by Crosby & Gregory
attys.

UNITED STATES PATENT OFFICE.

HENRY W. WINTER, OF BOSTON, ASSIGNOR TO JAMES W. BROOKS, TRUSTEE, OF CAMBRIDGE, MASSACHUSETTS.

TRIMMING-TOOL FOR BOOTS OR SHOES.

SPECIFICATION forming part of Letters Patent No. 402,376, dated April 30, 1889.

Application filed August 25, 1888. Serial No. 283,733. (No model.)

*To all whom it may concern:*

Be it known that I, HENRY W. WINTER, of Boston, county of Suffolk, State of Massachusetts, have invented an Improvement in Rotary Trimming-Tools for Boots or Shoes, of which the following description, in connection with the accompanying drawings, is a specification, like letters on the drawings representing like parts.

Application Serial No. 280,057, filed on the 16th day of July, 1888, shows and describes a trimming-tool having a series of hollow disk cutters attached to a plate by screws.

The tool herein shown has cutters substantially like those shown in that application, and with them I have combined a series of pinions which are engaged by means of a toothed adjusting plate or wheel, rotation of which simultaneously adjusts the cutters so that their cutting-edges may always be presented in like manner and under like conditions to the work to be cut.

Figure 1 is a side or edge view of a cutting-tool embodying my invention, one of the cutters being in section and the hub partially broken out; Fig. 2, a front or left-hand end view of the tool shown in Fig. 1, with the rand-gage removed; and Fig. 3 is a sectional view of the cutter and its attached gear.

The shaft $a$ has applied to it a plate, $c$, to which is secured by screws $e$ a series of cutters, $d$, the outer ends of the cutter-shaft having applied to it a rand-guard, $g$, having a lip, $g'$.

The parts so far described are substantially the same as in the application referred to, where like letters are employed to designate like parts.

The circular cutters $d$, herein shown as held in place by the screws $e$, have connected or formed as an integral part of them, outside the bosses $c'$, pinions $e^2$, which are engaged by the teeth at the periphery of a plate or gear, $f$, on the shaft $a$, the said plate or gear being loose on the said shaft and serving to simultaneously adjust the cutters $d$ when the set-screws $e$ are loosened to thereby enable the cutting-edges of all the cutters to be presented under like conditions to the work, and to enable the cutters to be adjusted for grinding, so as to keep the cutter of standard diameter.

I claim—

The herein-described trimming-tool, it consisting, essentially, of a plate, a series of circular cutters attached thereto, and connected pinions or teeth, combined with a plate or gear to engage and simultaneously rotate the said cutters more or less on the said plate, substantially as described.

In testimony whereof I have signed my name to this specification in the presence of two subscribing witnesses.

HENRY W. WINTER.

Witnesses:
G. W. GREGORY,
F. L. EMERY.